3,431,213
ARYL GRIGNARD REAGENT COMPOSITION
Richard D. Gorsich, Baton Rouge, La., assignor to Ethyl Corporation, New York, N.Y., a corporation of Virginia
No Drawing. Original application Nov. 2, 1964, Ser. No. 408,401. Divided and this application Feb. 5, 1968, Ser. No. 703,520
U.S. Cl. 252—182                             5 Claims
Int. Cl. C07f 7/26

ABSTRACT OF THE DISCLOSURE

A liquid composition comprising an aryl Grignard reagent, about 1 mole of hydrocarbon halide per 3 moles of aryl Grignard reagent and at least 1 mole of a cyclic monoether per mole of aryl Grignard reagent.

CROSS REFERENCE TO RELATED APPLICATION

This application is a division of application 408,401, filed Nov. 2, 1964, now pending.

BACKGROUND OF THE INVENTION

The preparation of certain organolead compounds by many processes has been known for sometime and according to at least one process, alkyl lead compounds may be produced by reacting an alkyl Grignard reagent with lead chloride; however, such a process has certain disadvantages in that relatively low yields are obtained and free lead is produced. Further, the free lead produced will not react with additional quantities of alkyl Grignard reagent for further conversion to alkyl lead compounds and thus the lead must be recovered, purified and if reused, converted to lead chloride.

A need has been demonstrated for tetravalent lead compounds having aromatic groups attached to the lead, and accordingly, it is an object of this invention to provide an improved process for the production of tetravalent lead compounds having aromatic groups attached to the lead. A further object of the invention is to produce aromatic organolead compounds in high yields and selectivities by combining in a first step an aromatic Grignard reagent with an organic halide and in the second step reacting the produced composition with a lead salt. A further object of the invention is to provide a liquid composition of aryl Grignard reagent, a hydrocarbon halide and a cyclic monoether which may be reacted subsequently with a lead salt to produce tetravalent lead compounds having aromatic groups attached to the lead. These and other objects will be apparent in the description which follows.

The process and composition of this invention may be more completely understood and illustrated by the following examples. All parts are by weight unless expressed otherwise.

Example I

Phenyl magnesium chloride was prepared by slowly adding 56 g. of chlorobenzene in 260 ml. of dry THF to 15 g. of magnesium turnings. The reaction was initiated with .5 ml. of ethylene bromide. The mixture was kept at 63–65° C. during the reaction by means of external heating. Excess magnesium was filtered off and standard acid titration of the Grignard indicated the solution to be 1.36 N.

A dry, 500-ml., 4-necked flask was charged with 97 ml. of the resultant tetrahydrofuran solution of phenyl magnesium chloride in an inert atmosphere. The reaction vessel was then fitted with a high speed stirrer, a thermometer, and a Dry Ice-isopropanol condenser. The system was assembled under a nitrogen atmosphere and a slight positive nitrogen pressure was maintained throughout the course of the reaction. After charging the condenser with Dry Ice-isopropanol, 7.7 g. of refrigerant grade methyl chloride was condensed into the reaction mixture while stirring and cooling.

A dry, 50 ml. flask was charged with 11.1 g. of lead chloride in an inert atmosphere. The vessel containing the lead chloride was connected with rubber tubing to the 500 ml. flask containing the phenyl magnesium chloride-methyl chloride-tetrahydrofuran composition. Subsequently, the lead chloride was added to the 500 ml. flask in small portions during a period of 13 minutes while rapidly stirring. The reaction temperature was maintained at 25° C. during the addition by external cooling. After the addition was complete, the reaction mixture was stirred at ambient temperature for one hour. The reaction mixture was then cooled to 10° C. and was slowly hydrolyzed with 6.9 g. of ammonium chloride in 75 ml. of water. The organic solution was flooded with water until the organic layer settled to the bottom. The product was extracted with heptane and lead was determined by the dithizone method. Analysis of the organic layer showed the solution to contain 7.92 g. (95.7% yield based on lead chloride) of Pb as triphenylmethyl lead. The product was isolated as a crystalline solid after evaporation of the solvent.

Example II

A high yield of triphenylmethyl lead was produced by repeating Example I with the exceptions that phenyl magnesium bromide was substituted for the phenyl magnesium chloride and the solvent used was a 50:50 volume mixture of tetrahydrofuran and ethyl ether.

Example III

Ortho-tolyl magnesium chloride, 120 mmols, in 130 ml. of tetrahydrofuran is combined with 65 mmols of n-butyl chloride with stirring. Thereafter 40 mmols of lead dichloride is added to the reaction flask while maintaining the reaction temperature at 25° C. A high yield of tetraorganolead compounds having both n-butyl and ortho-tolyl groups attached to the lead is obtained.

Example IV

Phenyl magnesium bromide, 100 mmols, in 50 ml. of tetrahydrofuran and 50 ml. of meta-dioxane is combined with 35 mmols of n-propyl chloride. Thereafter 30 mmols of lead dichloride is added to the reaction flask over a period of 60 minutes while maintaining the reaction temperature at 0° C.

Example V

Phenyl magnesium chloride, 125 mmoles, in 150 ml. of tetrahydropyran is combined with 75 mmols of methyl chloride at about 25° C. Thereafter 45 mmols of lead dibromide is added to the reaction flask over a period of time of 25 minutes while maintaining the reaction flask at a temperature of 25° C. The product is a combination of tetraorganolead compounds.

Example VI

Phenyl magnesium chloride, 70 mmols, in a solvent comprising 25 ml. of the dimethyl ether of diethylene glycol, 25 ml. of dimethyl ether and 75 ml. of tetrahydrofuran is combined with 30 mmols of methyl chloride at about 25° C. During a period of about 30 minutes, 30 mmols of lead naphthenate is added to the reaction mixture while maintaining the reaction mixture at a temperature of 5° C.

The aromatic lead compositions produced according to the present process comprise, in general, organolead compounds having an aromatic ring attached directly to lead and any remaining valences of the lead are satisfied by hydrocarbon radicals, preferably alkyl. Generally, the hydrocarbon radicals, other than the aromatic radicals, will contain from 1 to 12 carbon atoms, with the hydrocarbon radicals having one or 8 carbon atoms being particularly preferred. Especially preferred are the alkyl radicals of one or 2 carbon atoms. The hydrocarbon groups may be the same or different. The aromatic groups may also be the same or different. Examples of compounds that may be produced according to this invention are trimethylphenyl lead, dimethyldiphenyl lead, methyltriphenyl lead, diethyldiphenyl lead, ethyltriphenyl lead, methylethyl-o-tolyl lead, methyldiethylphenyl lead, n-butyltriphenyl lead, n-hexyltriphenyl lead, 2-ethylhexyltriphenyl lead, dimethylethylphenyl lead, tetraphenyl lead, isopropyltriphenyl lead, mixtures thereof and the like. However, as shown above the reaction is selective for the production of alkyltriaromatic lead compounds, such as alkyltriphenyl lead compounds.

Preferred organolead compositions are those containing as the major product alkyltriphenyl lead, such as methyltriphenyl lead. These compositions are valuable for antiknock compositions, and it is an important feature of this invention that these compositions may be produced directly.

The reaction should preferably be conducted in the presence of a cyclic ether. Apparently the cyclic ether functions not only as a solvent but also as a catalyst, particularly in regard to the reaction of the organic halide such as the alkyl halide with the other components. Another function of the cyclic ether is to influence the distribution of the products. The cyclic ether further appears to interact with the other reactants to increase the yield of aromatic lead compounds and to reduce the formation of by-product lead.

Suitable cyclic ethers are monoethers such as those having the formula

wherein R is an unsubstituted alkylene radical, R' is selected from the group consisting of an ethylene radical, an ethylenically unsaturated divalent hydrocarbon radical, >CHA and mixtures thereof; Z is selected from the group consisting of a methylene radical, >NA and mixtures thereof, and A is an aliphatic radical of from 1 to 10 carbon atoms. When Z is >NR, the ring will contain 6 members and Z and O will be 1, 4 with respect to each other. The cyclic ethers will suitably contain up to 20 carbon atoms. Suitably there will be at least one hydrogen atom attached to each carbon atom in the ring. The cyclic ether may be substituted with radicals which will not react with the aromatic Grignard reagent, the lead salt or the hydrocarbon halide. Suitable substituents are alkyl radicals such as ethyl, aryl radicals such as phenyl, alkoxy radicals such as methoxy, and aroxy radicals such as toloxy. The number of carbon atoms in the substituted radicals will be from one to 12, preferably from one to 8. Preferably the cyclic ethers will have from 5 to 6 atoms in the ring structure. Suitable cyclic ethers are tetrahydrofuran, 3-ethyl tetrahydrofuran 2-(o-tolxy) tetrahydrofuran, N-methyl morpholine, the methyl ether of tetrahydrofurfuryl alcohol, 3-phenoxy-tetrahydrofuran, 4-ethoxytetrahydrofuran, 2,5-dihydrofuran, tetrahydropyran, 4-methoxytetrahydropyran, 2-ethoxy-3, 4-dihydro-2H·pyran, mixtures thereof and the like.

The preferred cyclic ethers are tetrahydrofuran and tetrahydropyran with tetrahydrofuran being especially preferred. The oxygen of the cyclic ether must be free to form a complex with the aromatic Grignard reagent, consequently, the cyclic ethers employed should not have groups in the ring which would block the formation of a complex between the ring oxygen and the aromatic Grignard reagent.

The described cyclic ether should preferably be present in an amount of at least one mole of cyclic ether per mole of aromatic Grignard reagent during both the first and second steps of the process. Better results are generally obtained when the cyclic ether is present in an amount of greater than one mole per mol of aromatic Grignard reagent. The upper limit of cyclic ether is not particularly critical but for economic reasons will not ordinarily exceed about 5 moles of cyclic ether per mole of aromatic Grignard reagent. The desired ratio will be dependent somewhat on the amount of lead halide and alkyl halide present. A suitable range is from .5 to 4 moles of cyclic ether per mole of aromatic Grignard. The cyclic ether will, for best results, constitute at least 50 mole percent of the solvent and diluent present during the reaction to form the aromatic lead compounds.

The lead salts are preferably lead halides such as lead dichloride, although less desirably lead dibromide and lead diiodide may be employed or even lead dihalides having different halogen atoms attached to the lead. Lead tetrachloride may be employed but generally will be converted to the dichloride during the reaction. Other lead salts are lead acetate and lead naphthenate. Suitable lead salts are those that are known to react with Grignard reagents, such as phenyl Grignard reagents. Also mixtures of lead salts may be employed.

By the term aromatic Grignard reagent (i.e. an aromatic magnesium halide) is meant compounds of the formula RMgX wherein R is an aryl hydrocarbon radical wherein an aromatic ring is attached to the magnesium. The aryl radicals preferably contain a single benzene ring with the radicals being such as the phenyl radicals and the mono, di and tri aliphatic substituted phenyl radicals. The aliphatic substituents may be straight chain or branched. The aromatic Grignard reagents will have from 2 to 20 carbon atoms. Examples of aromatic Grignard reagents are phenyl magnesium chloride, O-tolyl magnesium chloride, o,p-methyl phenyl magnesium chloride, phenyl magnesium bromide, mixtures thereof and the like.

The aromatic Grignard agent of the formula RMgX may be produced in conventional manner. The halogen of the Grignard reagent and generally the halogen of the hydrocarbon halide will have an atomic weight of at least 35, that is, the halogen will be selected from the group consisting of chlorine, bromine, iodine and mixtures thereof. Chlorine is particularly preferred because of the excellent results and overall economy.

The hydrocarbon halide will be a compound of the formula RX wherein X is a halogen, preferably chlorine. Again less desirably, bromine and iodine may be used. The hydrocarbon radical may be normal or iso and will suitably have from 1 to 12 carbon atoms. Alkyl halides are preferred but cycloaliphatic halides may be employed. Alkyl radicals may be, for example, methyl, ethyl, propyl, isopropyl, n-butyl, isobutyl, 2-ethyl hexyl and the like. Examples of hydrocarbon halides are methyl chloride, methyl iodide, methyl bromide, ethyl chloride, n-propyl chloride, n-butyl chloride, isobutyl bromide, n-amyl chloride, n-octyl chloride, cyclohexyl chloride mixtures thereof and the like. Preferred alkyl halides are methyl chloride and ethyl chloride. Various combinations of the hydrocarbon halides may be used. For example, two or more hydrocarbon halides can be used simultaneously in a one-stage process or different hydrocarbon halides may be used in each stage of a two-stage process. Therefore, one method for producting mixed lead compounds wherein the hydrocarbon groups are different is to utilize a combination of hydrogen halides, such as combination of methyl chloride and ethyl chloride. The combined methyl chloride and ethyl chloride may then be reacted with the aromatic Grignard reagent and the lead halide. The mixture of hydrocarbon halides may be present in any combination, and more than two hydrocarbon halides may also be employed.

The ratio of the total hydrocarbon halide to the total lead salt may be varied somewhat but generally will be in the ratio of about 0.5 to 10 moles of hydrocarbon halide per mole of lead salt. A preferred ratio of hydrocarbon halide to lead salt is between 1 and 4 moles of hydrocarbon halide per mole of lead salt. The ratio of the moles of aromaitc Grignard reagent per mole of lead salt will normally be within the range of 2 to 10 but preferably will be present from 3 to 5 moles of aromatic Grignard reagent per mole of lead salt. The best overall results have been obtained at a ratio of about 3 moles of aromatic Grignard reagent and about one mole of hydrocarbon halide per mole of lead salt.

In the first step of the process the aromatic Grignard reagent is combined with the hydrocarbon halide. The exact mechanism of the overall reaction is not understood but, according to this invention, the aromatic Grignard reagent and the hydrocarbon halide must be combined prior to the reaction with the lead salt to produce a liquid composition. The aromatic Grignard reagent and the hydrocarbon halide may be added together, at once or gradually mixed. Thereafter the lead salt may be added at one time or in increments.

The reactor employed may be of conventional design. Commercial reactors used for the preparation of tetra-alkyllead by the reaction of sodium-lead alloys with an alkyl halide are satisfactory. The reactor should, of course, be suitable for operating under the pressure generated by the particular reactants at the temperature of reaction.

The temperature of reaction of either the first or second step of the reaction is not critical. It should be sufficiently high to give reasonable reaction rates but should not be above the decomposition temperature of the organometallic reactants or the organolead products. Thus, the operating temperature of the reaction depends upon the particular organometallic compounds involved. In general, suitable temperatures are between about −20° C. and about 150° C., but temperatures from about 0 to 50° C. are preferred to facilitate heat removal and for best results. Higher temperatures can be employed when using organolead thermal stabilizers. In some instances considerable exothermic heat is generated and consequently a cooling medium may be desired to control the temperature.

About atmospheric pressure is normally employed for both reactions, although subatmospheric pressure are permissible. In some instances, supraatmospheric pressure is preferred, particularly when employing a relatively high temperature and a relatively volatile solvent. Also, a pressure of inert gas such as nitrogen is sometimes desirable, for example, to assure anhydrous conditions. The pressure will generally be from about one to 10 atmospheres with the range of about atmospheric (STP) to 75 p.s.i.g. being generally suitable.

The products of this invention possess considerable utility. These compositions are soluble in hydrocarbons and are valuable as antiknock compositions for gasolines. The compositions containing the distributed species are of particular value. As has been shown this composition may be produced directly by the process of this invention.

Other embodiments of this invention can be made without departing from the spirit and scope of this invention which is not limited to the specific embodiments given herein.

I claim:

1. A liquid composition comprising a reactant compound about 1 mole of hydrocarbon halide per 3 moles of said reactant compound and at least 1 mole of cyclic monoether per mole of said reactant compound, said reactant compound being at least one represented by the formula RMgX, wherein R is an aryl hydrocarbon radical having an aromatic ring attached directly to the magnesium and X is a halogen selected from the group consisting of chlorine, bromine and iodine; said hydrocarbon halide being at least one compound represented by the formula R′X′ wherein R′ is at least one hydrocarbon radical selected from the group consisting of an alkyl radical having from 1 to 12 carbon atoms and cycloaliphatic radicals and X′ is a halogen selected from the group consisting of chlorine, bromine and iodine; and said cyclic monoether being at least one ether represented by the formula

wherein $R_1$ is an alkylene radical, $R_2$ is selected from the group consisting of an ethylene radical, an ethylenically unsaturated divalent hydrocarbon radical, $>CHA$; Z is selected from the group consisting of a methylene radical and $>NA$ and A is an aliphatic radical.

2. The liquid composition of claim 1 further characterized by said reactant compound being a mixture of reactant compounds as defined.

3. The liquid composition of claim 1 further characterized by said hydrocarbon halide being a mixture of hydrocarbon halides as defined.

4. The liquid composition of claim 1 further characterized by said cyclic monoether being a mixture of cyclic monoethers as defined.

5. The liquid composition of claim 1 further characterized by said cyclic monoether being tetrahydrofuran.

References Cited

UNITED STATES PATENTS 2,838,508   6/1958   Ramsden _____ 260—665 X
3,156,716   11/1964  Ramsden et al. _____ 260—437

LEON D. ROSDOL, *Primary Examiner.*

I. GLUCK, *Assistant Examiner.*

U.S. Cl. X.R.

260—437, 665; 252—386